(12) United States Patent
Polilli et al.

(10) Patent No.: US 7,797,173 B1
(45) Date of Patent: Sep. 14, 2010

(54) METHODS AND SYSTEMS FOR PROVIDING JUVENILE INSURANCE PRODUCT WITH PREMIUM WAIVER FEATURE

(75) Inventors: Robert J. Polilli, Tampa, FL (US); Michael A. Pfalzer, Tampa, FL (US); Jennifer L. Brady, Odessa, FL (US)

(73) Assignee: New York Life Insurance Company, New York, NY (US)

( * ) Notice: Subject to any disclaimer, the term of this patent is extended or adjusted under 35 U.S.C. 154(b) by 1245 days.

(21) Appl. No.: 10/723,996

(22) Filed: Nov. 26, 2003

(51) Int. Cl.
  *G06Q 40/00* (2006.01)
(52) U.S. Cl. ......................................... 705/4; 705/36 R
(58) Field of Classification Search ....................... 705/4
  See application file for complete search history.

(56) References Cited

U.S. PATENT DOCUMENTS

| | | | |
|---|---|---|---|
| 3,634,669 A | 1/1972 | Soumas et al. | |
| 4,566,066 A | 1/1986 | Towers | |
| 4,722,055 A | 1/1988 | Roberts | |
| 4,989,141 A | 1/1991 | Lyons et al. | |
| 5,132,899 A | 7/1992 | Fox | |
| 5,185,696 A | 2/1993 | Yoshino et al. | |
| 5,231,571 A | 7/1993 | D'Agostino | |
| 5,479,344 A | 12/1995 | Keziah, Jr. | |
| 5,502,637 A | 3/1996 | Beaulieu et al. | |
| 5,523,942 A | 6/1996 | Tyler et al. | |
| 5,590,037 A | 12/1996 | Ryan et al. | |
| 5,655,085 A * | 8/1997 | Ryan et al. ..................... | 705/4 |
| 5,689,649 A | 11/1997 | Altman et al. | |
| 5,712,984 A | 1/1998 | Hammond et al. | |
| 5,752,236 A * | 5/1998 | Sexton et al. .................. | 705/4 |
| 5,754,980 A | 5/1998 | Anderson et al. | |
| 5,761,645 A | 6/1998 | Hawkins | |
| 5,784,696 A | 7/1998 | Melnikoff | |
| 5,799,287 A | 8/1998 | Dembo | |
| 5,806,047 A | 9/1998 | Hackel et al. | |
| 5,812,987 A | 9/1998 | Luskin et al. | |
| 5,819,230 A | 10/1998 | Christie et al. | |

(Continued)

FOREIGN PATENT DOCUMENTS

JP     10228509 A     8/1998

(Continued)

OTHER PUBLICATIONS

ICICI Prudential Life Insurance. http://web.archive.org/web/20030711211642/iciciprulife.com/creative/blankproduct.jsp-?productid=169.*

(Continued)

*Primary Examiner*—Robert W Morgan
*Assistant Examiner*—Kristine K Rapillo
(74) *Attorney, Agent, or Firm*—Seth H. Ostrow; Ostrow Kaufman & Frankl LLP (57) ABSTRACT

The present invention provides methods and systems for providing juvenile insurance having a waiver of premium feature at a premium or death benefit computed based on a variable that is not directly dependent on the age, health, or gender of the initial owner or payor. In one embodiment, the premium or death benefit are computed based at least in part on a payor's affiliation with a group of acceptable payors marketed for juvenile insurance by an insurer, and a probability associated with an incidence of an event that triggers the waiver of premium feature occurring to an individual of the group or a subset of the group.

10 Claims, 3 Drawing Sheets

U.S. PATENT DOCUMENTS

| | | | |
|---|---|---|---|
| 5,864,828 | A | 1/1999 | Atkins |
| 5,893,071 | A | 4/1999 | Cooperstein |
| 5,918,217 | A | 6/1999 | Maggioncalda et al. |
| 5,933,815 | A | 8/1999 | Golden |
| 5,956,691 | A | 9/1999 | Powers |
| 5,978,778 | A | 11/1999 | O'Shaughnessy |
| 5,991,733 | A | 11/1999 | Aleia et al. |
| 5,991,740 | A | 11/1999 | Messer |
| 5,999,929 | A | 12/1999 | Goodman |
| 6,012,044 | A | 1/2000 | Maggioncalda et al. |
| 6,014,632 | A | 1/2000 | Gamble et al. |
| 6,021,397 | A | 2/2000 | Jones et al. |
| 6,026,364 | A | 2/2000 | Whitworth |
| 6,055,517 | A | 4/2000 | Friend et al. |
| 6,064,969 | A | 5/2000 | Haskins |
| 2002/0169715 | A1 | 11/2002 | Ruth et al. |
| 2003/0004844 | A1 | 1/2003 | Hueler |
| 2003/0028466 | A1 | 2/2003 | Jenson et al. |
| 2003/0093304 | A1* | 5/2003 | Keller et al. .................. 705/4 |
| 2003/0126053 | A1 | 7/2003 | Boswell et al. |
| 2003/0144888 | A1 | 7/2003 | Baron et al. |
| 2004/0078242 | A1* | 4/2004 | Weiss et al. .................... 705/4 |

FOREIGN PATENT DOCUMENTS

| | | |
|---|---|---|
| WO | WO 01/50306 | 7/2001 |
| WO | WO 01/69504 | 9/2001 |
| WO | WO 01/75557 A2 | 10/2001 |
| WO | WO 02/13118 A1 | 2/2002 |
| WO | WO 02/15457 | 2/2002 |
| WO | WO 02/35363 A1 | 5/2002 |
| WO | WO 03/012594 A2 | 2/2003 |
| WO | WO 03/058378 A2 | 7/2003 |

OTHER PUBLICATIONS

"An Argument for Children's Insurance." Donald E. Spinar. Life Association News. Washington: May 1993. vol. 88, Iss. 5; p. 126, 3 pgs.*

"Insurance Policies for Children: Good Investment Cover Too." Businessline. Chennai: Feb. 24, 2002. p. 1.*

"Life Insurance and the Child." Norman C. Olson. Manager's Magazine. Farmington: Nov. 1980. vol. 55, Iss. 11, p. 26.*

ICICI Prudential Life Insurance. http://web.archive.org/web/20030711211641/iciciprulife.com/creative/blankproduct.jsp-?productid=169.*

Anonymous. "A Shopper's Guide to Long-Term Care Insurance," National Association of Insurance Commissioners, 1999, 45 pages.

Black, Kenneth Jr. and Harold D. Skipper, Jr. *Life Insurance* 12$^{th}$ Ed., Englewood Cliffs, NJ, Prentice-Hall, Inc. 1994, Chapters 4 and 7.

Brown, Bruce. "KSH-2 Financial Calculator 1.6," *PC Week*, vol. 8, No. 31, Aug. 5, 1991, p. 78.

DeSimone, Marcella. "Early Enrollment Period Begins for Federal LTCI Program," *National Underwriter*, Apr. 1, 2002, vol. 106, No. 13, p. 40.

English, David. "Get Rich Quick," *Comput*, vol. 16, No. 98, Sep. 1994, p. 38.

Feldman, Saul. "Wealthbuilder 2.0," *Macworld*, vol. 10, No. 5, May 1993, p. 146.

Granza et al. "Financing Long-Term Care: Employee Needs and Attitudes, and the Employer's Role," International Society of Certified Employee Benefits Specials 1998 Benefits Quarterly, vol. 14, No. 4, pp. 60-72.

Iglehart, Mark. "Don't Gamble when Planning for Long-Term Care," *The National Public Accountant*, Apr. 2001, vol. 46, No. 2, p. 11, 2 pgs.

Iverson, Wesley. "From Desktop to the Web," *Financial Service Online*, Mar. 1999, p. 42+.

*Journal of Commerce*, "Life Before Death," Jun. 19, 1990, 2 pgs.

Kerry, Mark E. "Whole Life & an LTC Rider: One Solution to the Long-Term Care Dilemma," *Life Association News*, vol. 86, No. 7, Jul. 1991, pp. 71-75.

Poglianich, Antonio. "Life Care Communities: Evaluating a Promising Retirement Alternative," *Journal of the Institute of Certified Financial Planners*, vol. 9, No. 1, Spring 1988, pp. 29-34.

Pullman, Liz. "Personal Finance: CPAs Compute Pluses, Minuses of New Law Allowing Commissions," *Los Angeles Times*, Nov. 21, 1998.

Shipley, Chris. "12 Best Financial-Software Packages," *Working Woman*, vol. 18, No. 2, Feb. 1993, pp. 42-43.

TIAA-CREF Web Center. "Optional Long-Term Care Benefits," http://web.archive.org/web/20020210171521/http://www.tiaa-cref.org..., retrieved Apr. 7, 2005.

Ware, Robert C. "Medicare and Medicaid," *Life and Health Insurance Sales*, vol. 135, No. 11, Nov. 1992, pp. 28-30.

* cited by examiner

METHODS AND SYSTEMS FOR PROVIDING JUVENILE INSURANCE PRODUCT WITH PREMIUM WAIVER FEATURE

BACKGROUND OF THE INVENTION

This invention relates generally to juvenile insurance. More particularly, the present invention provides methods and systems for providing juvenile insurance with a waiver of premium feature.

Juvenile insurance is life insurance that insures the life of a minor or young adult, which is typically purchased by a parent or guardian when the insured is between the ages of about 14 days to about 17 years old. When the insured reaches an age of majority or some time thereafter, policy ownership is transferred to the insured upon which time the insured may elect to continue the policy. Juvenile insurance, particularly of the permanent type of life insurance, typically accumulates a cash value yearly that may be withdrawn or borrowed against, for example, by the insured for a down payment on a first home, to help pay for college, etc., and may guarantee future insurability for additional amounts of insurance. The term "permanent type of life insurance" generally refers to a life insurance policy that is in force throughout an insured's lifetime provided the conditions of the policy are satisfied, such as payment of the premium. Accordingly, juvenile insurance may be given to children as a valuable gift that will continue to be valuable for years after purchase. Juvenile insurance may also be purchased with a waiver of premium rider that, with regard to juvenile life, typically waives premiums upon the death of the payor until the insured reaches an age of majority, which further adds to the value of juvenile insurance.

The premium for juvenile insurance with a premium waiver rider is computed based on the age and/or gender of the payor. The premium for juvenile insurance will therefore vary depending on the age of the payor and will typically be higher for older payors, which makes juvenile insurance less attractive to older payors, such as grandparents, that want to purchase juvenile insurance for the children in their lives. Accordingly, there is a need for juvenile insurance that may be purchased at a premium that does not penalize older payors.

A few computerized systems have been adopted in the art for administering financial products, such as those described in Published United States Patent Application Nos. 2003/0126053, entitled "System and method for pricing of a financial product or service using a waterfall tool", 2002/028466, entitled "System and method for providing financial planning and advice", and 2002/0169715, entitled "System and method for administering a financial program involving the collection of payments, U.S. patent application Ser. Nos. 09/692,112 and 09/538,693, published as International PCT Applications Publication Nos. WO 02/35363, entitled "Interactive insurance premium verification system and method", and WO 01/75557, entitled "Financial product administration system and methods", respectively, each of which is hereby incorporated herein by reference. The systems and methods discussed in the above-identified references do not, however, address and consequently do not overcome the pricing shortcoming associated with juvenile insurance having a waiver of premium rider.

SUMMARY OF THE INVENTION

The present invention provides methods and systems for providing, among other things, juvenile insurance having a waiver of premium feature without some or all of the shortcomings associated with juvenile insurance currently available. In one aspect of the invention, a method for providing juvenile insurance having a waiver of premium feature is provided that includes the steps of obtaining information useful for issuing a juvenile insurance policy for a potential payor and an insured, and determining a premium or a death benefit for the potential payor. The premium and death benefit are computed based at least in part on a variable that is not directly dependent on at least one of age, health, and gender of the potential payor.

In one embodiment, the premium or death benefit is computed based at least in part on a probability associated with the incidence of an event that triggers the waiver of premium feature, such as the death of the payor, occurring to an individual of the group of acceptable payors based on at least one eligibility requirement or a subset of the group of acceptable payors. The group of acceptable payors may be defined based on various types of eligibility requirements, such as a maximum age for payors, a generational qualification for payors, etc. The probability of the incidence of the event that triggers the waiver of premium feature may account for limitations for exercising the waiver of premium feature, such as a 2-year waiting period, a generational qualification, or an age limit for the insured, and may also account for the blend of the individuals of the group of acceptable payors with regard to the age, gender, or generational qualification of the payor, or a combination thereof.

In one embodiment, the eligibility requirements require a payor to be associated with a group of individuals having at least one commonality between them. In another embodiment, the probability associated with an incidence of an event that triggers the waiver of premium feature for an individual of the group of acceptable payors or the subset of the group is determined based on mortality data for the group of acceptable payors or the subset of the group, respectively.

The waiver of premium feature may be a standard feature of the juvenile insurance policy or offered as a rider. In one embodiment, the waiver of premium feature is a standard feature, which advantageously makes the policy with the waiver of premium feature conducive to direct mail marketing.

In one embodiment, the premium and death benefit are computed based at least in part on the potential payor's affiliation with a group of individuals having at least one commonality between them, and a probability associated with an incidence of an event that triggers the waiver of premium feature occurring to an individual of the group of individuals having at least one commonality between them or a subset of the group given the age of the insured, the gender of the insured, or a combination thereof.

In another aspect, a method for providing juvenile insurance having a waiver of premium feature is provided that includes the steps of obtaining information useful for issuing a juvenile insurance policy for a potential payor and an insured, which includes the age of the insured, the gender of the insured, or both, determining whether the potential payor belongs to a group of acceptable payors based on eligibility requirements, and determining a premium or a death benefit for the potential payor. The premium and death benefit are computed based at least in part on the payor's affiliation with the group of individuals having at least one commonality between them, the age or gender of the insured, or a combination thereof, and a probability associated with the incidence of an event that triggers the waiver of premium feature occurring to an individual of the group of individuals having at least one commonality between them or a subset of the group of individuals having at least one commonality between them given the age or gender of the insured. In this instance, the event that triggers the waiver of premium feature includes death of the payor.

In another aspect, a method for providing juvenile insurance having a waiver of premium feature is provided that includes the steps of obtaining information useful for issuing a juvenile insurance policy for a potential payor and an insured, determining whether the potential payor belongs to a group of acceptable payors based on eligibility requirements, and determining a premium or a death benefit for the potential payor. The premium and death benefit are computed based at least in part on a probability associated with an incidence of an event that triggers the waiver of premium feature occurring to an acceptable payor.

In another aspect, a method for providing juvenile insurance having a waiver of premium feature is provided that includes the steps of determining a premium or a death benefit for a juvenile insurance policy for a potential payor and an insured, and offering the juvenile insurance policy at the premium or death benefit based on the age of the insured. The premium and death benefit are computed for each of a plurality of possible issue ages of an insured based at least in part on the payor's affiliation with a group of individuals having at least one commonality between them and a probability associated with an incidence of an event that triggers the waiver of premium feature, such as death of the payor, occurring to an individual of the group of individuals having at least one commonality between them, such as members of the AARP, or a subset of the group. The subset of the group of acceptable payors may be defined as those individuals of the group able to purchase juvenile insurance based on limitations for insurability.

In one embodiment, the probability associated with an incidence of an event that triggers the waiver of premium feature for an individual of the group of individuals having at least one commonality between them or a subset of the group of individuals having at least one commonality between them is determined based on mortality data for the group of individuals having at least one commonality between them or the subset of the group of individuals having at least one commonality between them, respectively.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

The present invention generally provides methods and systems for providing juvenile insurance having a premium waiver feature, as a rider or as a standard feature of the insurance policy, at a premium that does not depend directly on and therefore does not vary depending on the age, health, or gender of the payor at least with respect to the group of acceptable payors for juvenile insurance and thereby does not penalize older payors. The term "premium" is used herein to denote the purchase price of an insurance policy, which may be paid in a series of periodic payments, such as monthly, semiannually, yearly, etc. The term "payor" is used herein to generally include an individual that is the initial owner or purchaser of the policy, or who is otherwise responsible for paying a premium on the policy. The group of acceptable payors refers to a group defined by the eligibility requirements for juvenile insurance. Thus, if juvenile insurance as described herein is limited to individuals associated with a particular group or organization, the group of acceptable payors includes individuals associated with the organization or group. If juvenile insurance is offered on an individual basis irrespective of group association, the group of acceptable payors includes all individuals subject to qualifications, such as generational qualifications, age qualifications, etc.

Figure 1:
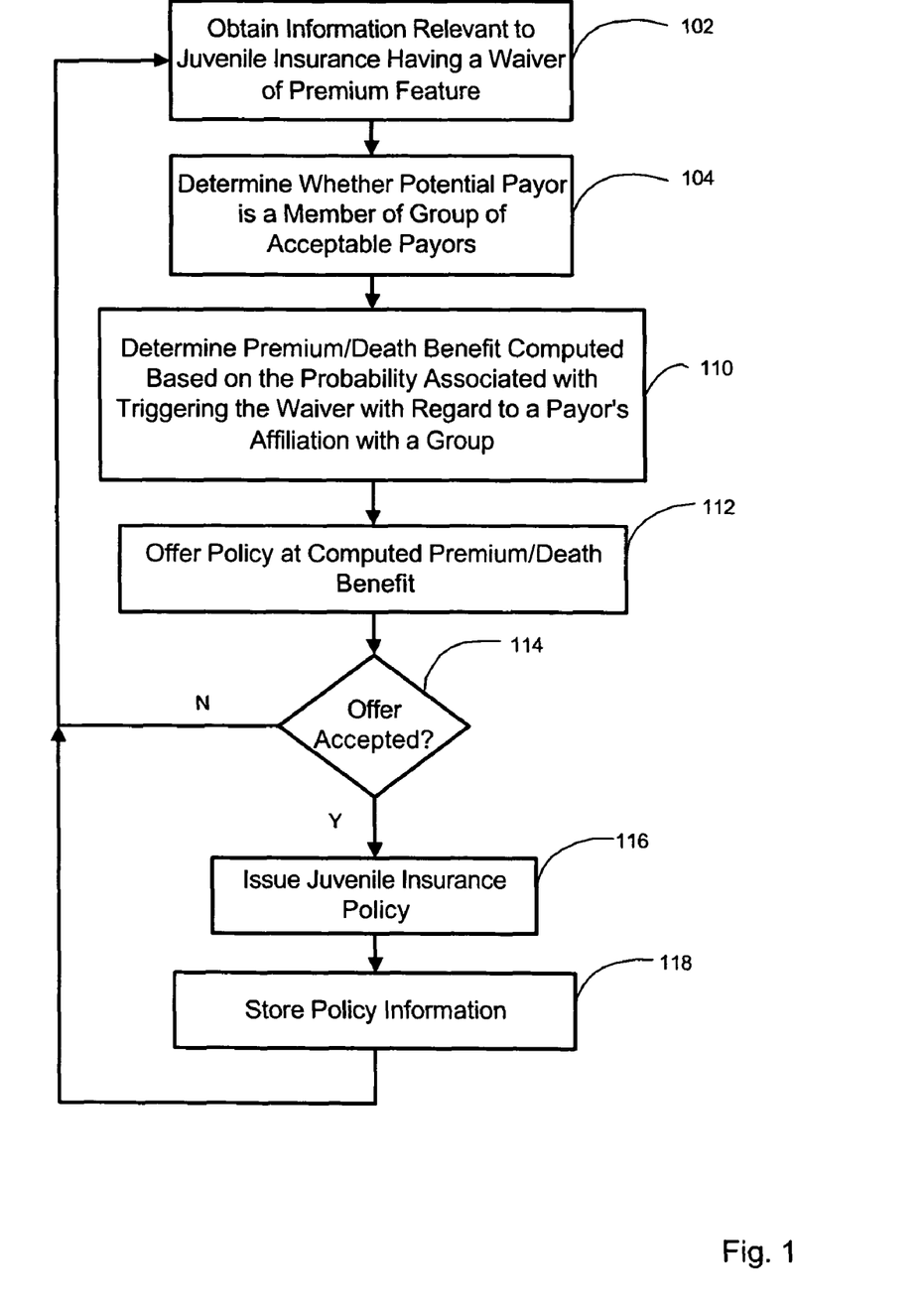
FIG. 1 is a flowchart of a method of providing juvenile insurance having a waiver of premium feature according to one embodiment of this invention.

Referring to FIG. 1, a method for providing juvenile insurance with a waiver of premium feature according to one embodiment of this invention begins at step 102 with obtaining information from an individual or individuals, such as from a potential purchaser or payor, that is useful for issuing a juvenile insurance policy having a waiver of premium feature. Insurance policies may be purchased in various ways and in various forms. For instance, a purchaser may specify a desired premium that the purchaser is willing to pay, which may be paid in one or more in periodic payments, and a death benefit may be computed or otherwise determined based on the desired premium. Alternatively, the purchaser may specify or select a desired death benefit and a premium may be computed or determined based on the desired death benefit. Accordingly, certain items of information, such as the premium or death benefit amount may be factored into or used as a basis for computing or determining a premium or death benefit and may therefore be necessary items of information.

The type of information that is useful for issuing the juvenile insurance policy may vary, and may include personal information regarding the potential payor and the potential insured, information regarding variables or options associated with juvenile insurance, etc. Personal information may include the name, date of birth, age, address, and gender of the payor or of the insured, the payors association with a group or groups, etc. Variables associated with juvenile insurance may include a desired death benefit, a desired premium, selection of riders or other options, limitations, etc.

Some or all of the variables associated with juvenile insurance, such as death benefits, the availability of certain riders or options, limitations, etc., may be specified by the insurer and may not therefore be subject to negotiation or change. For example, the insurer may limit death benefits to a maximum of $10,000, limit the maximum eligible age of a payor to 80 years old, require that the policy be in force at least 2 years as a condition to the waiver of premium payments, limit eligibility to specific groups or organizations, limit eligibility to particular generations of payors, such as grandparents, etc. Accordingly, in this instance, a determination is made at step 104 whether the potential payor is an acceptable payor based on eligibility for the juvenile insurance policy. An insurer is used herein to denote the party offering and/or guaranteeing the juvenile insurance contract. The insurer may therefore be an insurance company, a guarantor, an employer, a private party, agents thereof, etc.

In one embodiment, information regarding the payor's association with a group or organization, the age or gender of the insured, or a combination thereof, are used to compute a premium or as a basis for offering juvenile insurance at a computed or otherwise determined premium, and is therefore a necessary item of information. At least one policy variable, such as a premium or death benefit, for the juvenile insurance policy having a waiver of premium feature may then be determined or computed at step 110. In accordance with one embodiment of the present invention, the premium or death benefit is computed based on at least one variable or factor that is independent of or not directly dependent on the age, health, or gender of the payor. In other words, the juvenile insurance policy will not be underwritten based on the payor. The policy variable may be computed individually for each application for juvenile insurance, or may computed for a variety of circumstances and tabulated or stored in a database, such as a policy variable database, that may be accessed, e.g., by an insurance agent or an employee of the insurer, at a later date for determining the premium or death benefit for a potential payor based on the information provided.

Various variables or factors may be used to compute the premium or the death benefit. In one embodiment, juvenile insurance having a waiver of premium feature in accordance with the present invention is made available to individuals that are associated with at least one group or organization of individuals having at least one commonality between them. For instance, juvenile insurance may be offered to individuals belonging to an organization, such as AARP, a group of employees of one or more companies, etc. The group may also be defined by geographic boundaries, such as counties, cities, states, countries, etc. Pricing for juvenile insurance for the group of acceptable payors based on group association may therefore be derived or based at least in part on the probability or rate of the incident of an event that triggers the waiver of premium feature, such as death, of an individual member of the group of acceptable payors or a subset thereof. In one embodiment, pricing is derived at least in part on a pricing mortality rate $_t q^{(d)}_x$ algorithm provided in Appendix A. A subset may be defined by the individuals of the group able to be a purchaser of juvenile insurance, for example, based on limitations for insurability, such as eligibility requirements defining the minimum and maximum ages for payors, generational qualification, etc. In one embodiment, the policy is provided as individual insurance that is not limited to individuals belonging to a particular group or organization. In this instance, the premium or death benefit may be computed based on the probability of the incidence of the event that triggers the waiver of premium feature with regard to the general population or a subset of the general population based on eligibility requirements for juvenile insurance.

In one embodiment, the probability of the incident or the triggering event, such as death, of an individual of the group of acceptable payors or a subset thereof is derived independent of the individual's age, health, or gender. The probability may be derived based on known data, e.g., historical data, presumptions, statistics, etc., or a combination thereof, regarding the group of acceptable payors, a subset of the group, similar groups, the general population, etc. For instance, the probability of death of an individual member of a group of acceptable payors may be derived based on known mortality data of the group or a subset of the group, or inferred based on known mortality data of a similar group or of the general population. In the instance the premium or death benefit is computed either alone or primarily based on the probability of death of an individual in the group of acceptable payors or the subset of the group, the premium may be set equal for every member of the group or subset thereof. In one embodiment, the pricing for juvenile insurance for the group of acceptable payors or subset thereof is further based on the age, gender, or a combination thereof, of the insured. In this instance, the premium or death benefit will not vary based on the age or gender of the payor, rather, the premium or death benefit will vary based on the age at issue or gender of the insured. In one embodiment, an annual premium $G_x$ is computed at least in accordance with one or more of the algorithm provided in Appendix A. The probability of the incidence of the event that triggers the waiver of premium feature may further account for incidences that will not trigger the waiver or trigger an end for the waiver benefit, for example, due to restrictions or limitations with regard to the waiver, such as a 2-year waiting period, an age limit for the insured, such as 21 years of age, etc.

The incident triggering the waiver may similarly be an event, other than the death of the payor, which affects the payor's ability to pay the premium on the juvenile insurance policy, such as a severe injury, disability, disease, unemployment, etc. Accordingly, the waiver may continue until either the age of majority of the insured or until the triggering event is mitigated, for example, by the payor recovering from the injury or disease, regaining employment, etc., or until some predefined time after the triggering event, e.g., 6 months, 1 year, etc.

In one embodiment, the premium or death benefit is determined based on a rate of incidence of the event triggering the waiver of premium feature, such as a mortality rate, for a blend of the individuals of the group of acceptable payors or subset of the group, or the product of the rate of incidence for the blend and an anti-selection factor. That is, the probability the triggering event for an individual member of the group or of a potential payor takes into account the particular blend of the individuals of the group of acceptable payors or of the subset of the group by, for example, age, gender, generational classifications, etc. The incident rate for the blend may be determined based on known correlations or on assumptions regarding the individuals of the group or payors given the age of the insured, which assumptions may be based on the experience or professional judgment of the insurer, with or without adjustments for conservative estimation. The assumption regarding the blend of individuals or payors may be based on historical insurance data regarding a blend of payors by gender, the generational blend of payors, the blend of ages for mothers and for grandmothers, and the blend of ages for fathers and grandfathers. These assumptions are particularly probative with respect to computing the premium or death benefit for juvenile insurance with limited generational eligibility, such as juvenile insurance limited to individuals of the group of acceptable payors that are grandparents of an insured.

The blend of payors by gender may be derived from known data for the distribution of applications for insurance by gender that have been processed by the insurer, and the distribution by gender of certificate owners or of actual issued policies. The generational blend, e.g., the proportion of parents and grandparents, of the group of acceptable payors, may be derived based on the market targeted for the juvenile insurance. For instance, an older targeted market may result in a larger proportion of certificates issued to grandparents than parents. The blend of ages for mothers and the blend of ages for grandmothers may be based on the National Center for Health Statistics that provides tabulated data regarding the number of live births by the age of the mother for the years 1933-1998, and the blend of ages for fathers and the blend of ages for grandfathers may be based on the average age difference between married customers in conjunction with the blend of female ages.

The anti-selection factor applied to the blended rate of incidence generally accounts for any anti-selection that may occur by not underwriting the life that determines qualification for the waiver benefit. In one embodiment, the anti-selection factor is determined based on the experience or judgment of the insurer. For example, the anti-selection factor may be derived from a ratio of the mortality rate experienced for a guaranteed acceptance life insurance product to the mortality rate of the general population. Mortality may be calculated as the mortality rate for the blend of ages of purchasers or payors. In one embodiment, the anti-selection factor $_tf^{(1)}{}_x$ is computed with one or more of the algorithms provided in Appendix A. A portion of the ratio, e.g., calculated geometrically, may then be used as the anti-selection factor to reflect the portion of the anti-selection the insurer would expect with juvenile insurance having a waiver of premium feature as described herein. In general, if anti-selection is expected to be $1/k^{th}$ of the anti-selection experienced with a guaranteed issue life insurance product (where k is a non-zero real number), and the anti-selection factor for the guaranteed acceptance life insurance product is $_tf_x{}^{ga}$, then $_tf_x{}^{(1)}=[_tf_x{}^{ga}]^{1/k}$. Since the premium waiver benefit is not as prominent as the death benefit on a guaranteed issue life insurance product, the mortality rate used to calculate the incidence rates should be somewhere between mortality for guaranteed acceptance life insurance and mortality for the general population.

In one embodiment, the premium or death benefit is computed for each issue age of the insured of a plurality of possible issue ages based on the cost of the waiver feature, such as with the cost of waiver $_tC^{(w)}{}_x$ algorithms provided in Appendix A. The cost of the waiver feature at any duration is generally the product of the number of new waiver incidences for a particular issue age in the duration and the severity of the benefit for that issue age in the duration. The waiver incidence rate is generally the probability of the incidence of the event that triggers the waiver of premium feature as described above. The severity of the waiver benefit may be computed as the present value of expected future premiums to be waived. The number of new waiver incidences $_td^{(w)}{}_x$ and the severity $_tS_x$ may be computed with the algorithms provided in Appendix A.

With regard to the algorithms provided, the number of new waiver incidences $_td^{(w)}{}_x$ expected at a given time in years after issuance is generally a function of total lives in-force $_t1^{(\tau)}{}_x$, the number of lives not-eligible-for-waiver $_t1^{(nw)}{}_x$, the number of certificates already receiving the waiver benefit $_t1^{(w)}{}_x$, and the waiver incidence rate $_tq^{(w)}{}_x$. The number of new not-eligible-for-waiver incidences $_td^{(nw)}{}_x$ is a function of total lives in-force $_t1^{(\tau)}{}_x$, the number of certificates already not eligible for the waiver benefit $_t1^{(nw)}{}_x$ and the not-eligible-for-waiver incidence rate $_tq^{(nw)}{}_x$. The number of lives not-eligible-for-waiver $_t1^{(nw)}{}_x$, or the accumulated number of lives that are not eligible for the waiver benefit, is a function of lives not-eligible-for-waiver in a prior year, lapse rates $_{t-1}q^{(1)}{}_x$, mortality rates $_{t-1}q^{(d)}{}_x$, and new not-eligible-for-waiver incidences $_{t-1}d^{(nw)}{}_x$. The number of lives not-eligible-for-waiver is increased by new not-eligible-for-waiver incidences. Issued policies are exposed to both deaths and lapses, and pricing may account for these factors. The number of lives on the waiver benefit $_t1^{(w)}{}_x$, or the accumulated number of lives that are receiving the waiver benefit, is a function of lives on the waiver benefit in the prior year, waiver continuance, and new waiver incidences $_td^{(w)}{}_x$. The continuance rate accounts for the exposure to deaths of the insured, but not lapses, and that waivers will end when the insured attains the age of 21. The expected future premiums to be paid are a function of the premium and the continuance rate.

Certificates receiving the waiver benefit are assumed not to lapse. An adjusted lapse rate $_tq^{(1)}{}_x$ for the insured's age at issue x, duration t may be calculated as issue age x lapses in duration t divided by total issue age x lives in-force in duration t. The adjusted lapse rate is less than the unadjusted lapse rate in durations prior to attained age 21. The adjusted lapse rate decreases the surrender benefits paid in earlier durations, e.g., prior to attained age 21, and increases the surrender benefits paid in later durations, e.g., attained age 21 and later. Because the adjusted lapse rate is less than the unadjusted lapse rate in durations prior to attained age 21, the exposure to the death benefit increases which in turn increases the death benefits paid per unit issued.

Expenses may be adjusted to reflect that certificates on premium wavier will not be sent a billing statement. The adjusted billing expenses per certificate $_tE^{(m)}{}_x$ are a function of maintenance expenses per certificate $_tE^{(m)}{}_x$, the portion of maintenance expenses that can be attributed to billing $e^{(b)}$, in-force lives $_t1^{(\tau)}{}_x$, and the portion of in-force lives receiving the waiver benefit $_tz^{(w)}{}_x$. Billing expenses for attained age 21 and older are not adjusted since the benefit is no longer applicable.

Once a premium or death benefit is computed, the insurance policy may be offered to the potential purchaser or payor at step 112, provided the eligibility requirements have been satisfied. If at step 114 the potential purchaser or payor does not accept the offer to purchase the policy, the information obtained may either be saved, such as on the computer system described below, for future reference or discarded, and one or more of the steps described above can be repeated for the next potential purchaser. If the offer is accepted at step 114, the juvenile policy may issue at the computed or determined premium at step 116. The steps required to issue a policy vary depending on the relationship between the individual that obtained the information and the insurer. For example, where the insurer or a party authorized to act on behalf of the insurer obtained the information, the policy may issue automatically or at some predetermined time thereafter, e.g., 30 days, etc. If however the individual is an insurance agent with limited authority to bind the insurer, the policy may issue only after first being reviewed and accepted by the insurer. In any event, if the policy issues, the information obtained, such as the personal information, juvenile insurance variables, etc., and any other relevant information are stored at step 118 in an appropriate database, such as a juvenile life insurance database.

Figure 2:
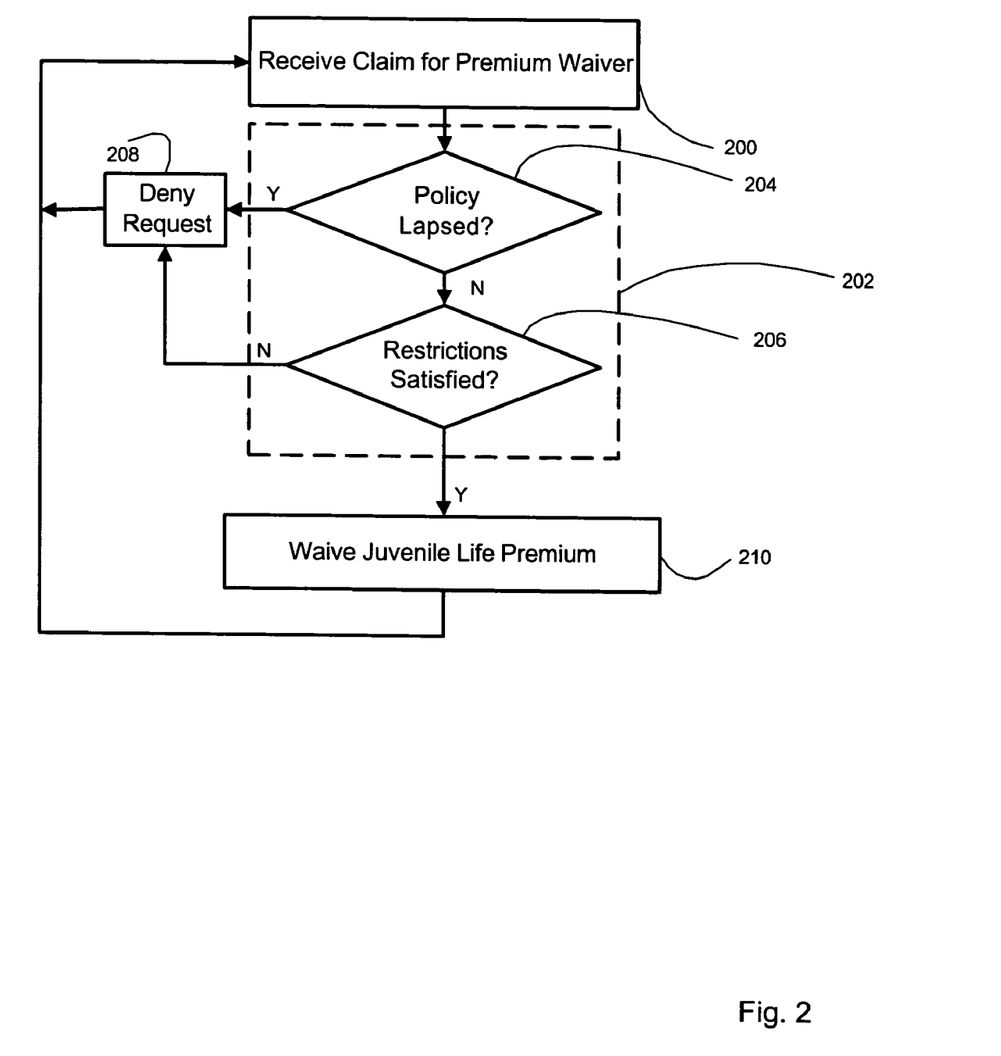
FIG. 2 is a flowchart of a method of administering juvenile insurance having a waiver of premium feature according to one embodiment of this invention.

Referring to FIG. 2, a method of administering juvenile insurance having a waiver of premium feature begins, in one embodiment, with receiving at step 200 a claim for a premium waiver. The claim is generally a request or demand, which is designed to give notice to the insurer regarding an event that triggers the waiver of premium feature, such as the death of the payor. The claim may be received from the insured in a variety of ways, including a hard copy claim or an electronic version thereof The claim will then be tested at 202 with the limitations set forth in the juvenile insurance policy for which the claim is being exercised, and any corresponding information related thereto. Testing the claim 202 generally denotes determining whether or not to waive the premium for the juvenile insurance policy.

In one embodiment, testing includes determining at 204 whether or not the policy is in effect or has otherwise lapsed. In another embodiment, testing includes determining at 206 whether or not any limitation or restriction that must be satisfied prior to waiving the premium has been satisfied, such as determining whether a 2-year wait period has been satisfied, lapse of the waiver feature due to the insured's age, etc.

If at steps 202, 204, or 206 the demand fails with regard to the limitations or restrictions set forth in the annuity contract, the claim will be denied at step 208, and the above steps may be repeated for the next or subsequent claims. If the claim passes the testing criteria, the premium will be waived at step 210 for the juvenile policy having the waiver of premium feature in accordance with the present invention as described above.

Figure 3:
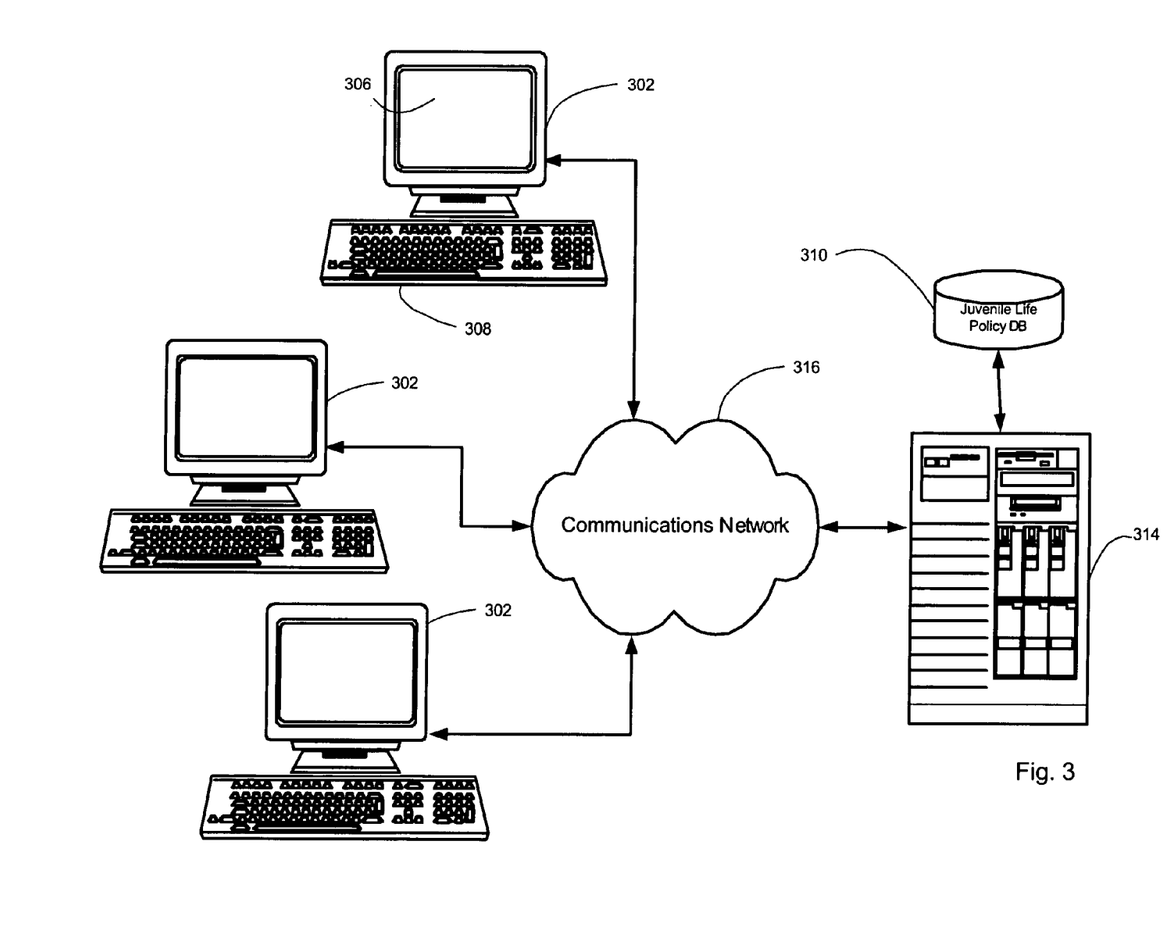
FIG. 3 is a diagram of a system useful for providing juvenile insurance having a waiver of premium feature according to one embodiment of this invention.

Referring to FIG. 3, a system useful in providing juvenile insurance having a waiver of premium feature according to one embodiment of this invention includes a client interface 302 having a processor and associated computer memory, a display device 306, and an input device 308. The client interface 302 is at least one of a programmable calculator, or a personal computer or special purpose computer having appropriate software or otherwise designed to compute or assist in determining the juvenile insurance premium or a death benefit according to the methods described herein. The software may be installed locally at the client interface 302, thereby enabling a user to input information obtained regarding the insurance policy, and to determine a premium for the insurance policy given a selected or specified death benefit, or to determine a death benefit given a selected or specified premium. The software may be proprietary software designed to provide the methods described herein or, alternatively, commonly available software, such as spreadsheet or a database programs, adopted to perform the same. Juvenile insurance may be sold through insurance agents, or with other types of sales techniques, including directly by the insurer via direct mailing, advertisements, the Internet, etc., or a combination thereof. The system as described herein maybe therefore be made accessible to various users, including brokers, agents, employee of the insurer, potential insureds, potential payors, etc.

In an alternative embodiment, the client interface 302 is communicatively connected to at least one server 314 over a communications network 316, such as a local area network (LAN), a wide area network (WAN), the Internet, the World Wide Web (WWW), a wireless network, or a combination thereof. The server 314 includes at least one database, such as a juvenile life insurance database 310. The juvenile life insurance database 310 generally includes information obtained from payors or purchasers that is useful for issuing the juvenile insurance policy, such as personal information, juvenile insurance variables, juvenile insurance options, etc.

In one embodiment, the client interface 302 accesses the relevant database or databases, stored locally at the client interface 302 or remotely at the server 314, for information necessary to compute or otherwise determining the premium or the death benefit for the juvenile insurance policy, and may update the relevant databases accordingly. Similarly, the client interface 302 accesses the juvenile life policy database to test a claim for a waiver of premium.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

Appendix A

Issue age refers to issue age of the insured.

$_t q^{(b)}_x$ = blended applicant mortality, issue age x, time t
$_t f^{(1)}_x$ = anti-selection factor due to not underwriting applicant, issue age x, time t
$_t q^{(d)}_x$ = pricing mortality rate, issue age x, time t
$_t q^{(1)}_x$ = unadjusted lapse rate, issue age x, time t
$_t q'^{(1)}_x$ = adjusted lapse rate, issue age x, time t
$_t q^{(w)}_x$ = waiver incidence rate, age x, time t
$_t q^{(nw)}_x$ = not-eligible-for-waiver incidence rate, age x, time t
v = interest rate discount factor
i = interest rate
$_t l^{(\tau)}_x$ = beginning of year lives, issue age x, time t
$_t l^{(nw)}_x$ = beginning of year lives not-eligible-for-waiver, issue age x, time t
$_t l^{(w)}_x$ = beginning of year lives on waiver, issue age x, time t
$_t d^{(d)}_x$ = deaths, issue age x, time t
$_t d(1)_x$ = lapses, issue age x, time t
$_t d^{(w)}_x$ = new waiver incidences, issue age x, time t
$_t d^{(nw)}_x$ = new not-eligible-for-waiver incidences, issue age x, time t
$_t Z^{(w)}_x$ = portion of lives on waiver, issue age x, time t
$_t e^{(b)}_x$ = portion of maintenance expense per certificate attributed to billing, issue age x, time t
$_t E^{(m)}_x$ = maintenance expense per certificate, including billing expenses, issue age x, time t
$_t E^{(o)}_x$ = all other expense, issue age x, time t
$_t E'^{(m)}_x$ = adjusted maintenance expense per certificate, including billing expenses, issue age x, time t
$G_x$ = annual premium, issue age x
$_t S_x$ = severity of waiver claim, issue age x, time t
$_t P^{(d)}_x$ = waiver continuance rate
$_t DB_x$ = Death benefit, issue age x, time t
$_t CV_x$ = End of year cash value, issue age x, time t
$_t C^{(o)}_x$ = Cost of other feature, issue age x, time t
$_t C^{(w)}_x$ = Cost of Waiver, issue age x, time t
$_t C^{(d)}_x$ = Cost of Death Benefit, issue age x, time t
$_t C^{(1)}_x$ = Cost of Surrender Benefit, issue age x, time t
$_t I_x$ = Income other than premium, issue age x, time t
$_t T_x$ = Taxes, issue age x, time t
$_t V^{(\Delta d)}_x$ = Increase in Reserves for Death Benefit, issue age x, time t
$_t V^{(\Delta w)}_x$ = Increase in Reserves for Waiver Benefit, issue age x, time t
$_t V^{(\Delta o)}_x$ = Increase in Reserves for Other Benefits, issue age x, time t
$_t V^{(\Delta \tau)}_x$ = Increase in Reserves for All Benefits, issue age x, time t
$_t R_x$ = Profit, issue age x, time t $_t q^{(nw)}x$ = not-eligilbe-for-waiver incidence rate, age $x$, time $t$ $$= \begin{cases} _t q^{(b)}_x \cdot _t f^{(1)}_x & \text{for } t = 1, 2 \\ 0 & \text{for } t > 2 \end{cases}$$

$_t q^{(w)}_x$ = waiver incidence rate, age $x$, time $t$ $$= \begin{cases} 0 & \text{for } t = 1, 2 \\ _t q^{(b)}_x \cdot _t f^{(1)}_x & \text{for } t > 2 \end{cases}$$

$_t l^{(\tau)}_x$ = beginning of year lives, issue age $x$, time $t$ $$= _{t-1} l^{(\tau)}_x - _t d^{(d)}_x - _t d^{(l)}_x$$

$_t l^{(nw)}_x$ = beginning of year lives-not-eligible-for-waiver, issue age $x$, time $t$ $$= \begin{cases} 0 & \text{for } t = 1 \\ _{t-1} l^{(nw)}_x (1 - _{t-1} q^{(d)}_x - _{t-1} q^{(l)}_x) + _{t-1} d^{(nw)}_x & \text{for } t > 1 \end{cases}$$

$_t l^{(w)}_x$ = beginning of year lives on waiver, issue age $x$, time $t$ $$\begin{cases} 0 & \text{for } t = 1 \\ _{t-1} l^{(w)}_x \cdot (1 - _{t-1} q^{(d)}_x) + _{t-1} d^{(w)}_x & \text{for } t > 1 \end{cases}$$

-continued $_t d_x^{(d)}$ = deaths, issue age $x$, time $t$ $$= {}_t l_x^{(\tau)} \cdot {}_t q_x^{(d)}$$

$_t d_x^{(l)}$ = lapses, issue age $x$, time $t$ $$= ({}_t l_x^{(\tau)} - {}_t l_x^{(w)}) \cdot {}_t q_x^{(l)}$$

$_t d_x^{(nw)}$ = new not-eligible-for-waiver incidences, issue age $x$, time $t$ $$= ({}_t l_x^{(\tau)} - {}_t l_x^{(nw)}) \cdot {}_t q_x^{(nw)}$$

$_t d_x^{(w)}$ = new waiver incidences, issue age $x$, time $t$ $$= ({}_t l_x^{(\tau)} - {}_t l_x^{(nw)} - {}_t l_x^{(w)}) {}_t q_x^{(w)}$$

$_t q_x^{(l)'}$ = adjusted lapse rate, issue age $x$, time $t$ $$= \frac{{}_t d_x^{(l)}}{{}_t l_x^{(\tau)}}$$

$_t z_x^{(w)}$ = portion of lives on waiver, issue age $x$, time $t$ $$= \frac{{}_t l_x^{(w)} + .5 ({}_t d_x^{(w)})}{{}_t l_x^{(\tau)} - .5 ({}_t d_x^{(d)} + {}_t d_x^{(l)})}$$

$V$ = interest rate discount factor $$= \frac{1}{(1+i)}$$

$_t E_x^{(m)'}$ = adjusted maintenance expense, including billing expenses $$= \begin{cases} {}_t E_x^{(m)} \cdot e^{(b)} \cdot (1 - {}_t z_x^{(w)}) + {}_t E_x^{(m)} \cdot (1 - e^{(b)}) & \text{for } t + x < 21 \\ {}_t E_x^{(m)} & \text{for } t + x > 20 \end{cases}$$

$_t S_x$ = severity of waiver claim, issue age $x$, time $t$ $$= .5 G_x \cdot v^{\frac{1}{4}} + \sum_{j=1}^{2t-(x+t)} \left( G_x \cdot {}_j p_{x+t}^{(d)} \cdot v^j \right)$$

$_j p_{x+t}^{(d)}$ = waiver continuance rate $$= \begin{cases} \prod_{i=0}^{j-1} \left( 1 - q_{x+t+i}^{(d)} \right) & \text{for } t + x < 21 \\ 0 & \text{for } t + x > 20 \end{cases}$$

$_t C_x^{(w)}$ = Cost of Waiver, issue age $x$, time $t$ $$= {}_t S_x \cdot {}_t d_x^{(w)}$$

$_t C_x^{(d)}$ = Cost of Death Benefit, issue age $x$, time $t$ $$= {}_t d_x^{(d)} \cdot {}_t DB_x \cdot v$$

$_t C_x^{(l)}$ = Cost of Surrender Benefit, issue age $x$, time $t$ $$= {}_t l_x^{(\tau)} \cdot {}_t q_x^{(l)'} \cdot {}_t CV_x \cdot v$$

$_t V_x^{(\Delta \tau)}$ = Increease in Reserves for All Benefits, issue age $x$, time $t$ $$= {}_t V_x^{(\Delta \tau)} + {}_t V_x^{(\Delta w)} + {}_t V_x^{(\Delta o)}$$

$_t R_x$ = Profit, issue age $x$, time $t$ (for simplification– assume premiums are paid annually at beginning of year and deaths and lapses occur at the end of the year)

$$= {}_t l_x^{(\tau)} \cdot (G_x + {}_t I_x) - {}_t C_x^{(w)} - {}_t C_x^{(d)} - {}_t C_x^{(l)} -$$

$${}_t l_x^{(\tau)} \cdot \left( {}_t C_x + {}_t E_x^{(m)'} + {}_t E_x^{(o)} + {}_t V_x^{(\Delta \tau)} + {}_t T_x \right)$$

What is claimed is:

1. A method for providing juvenile insurance having a waiver of premium feature comprising:

electronically obtaining information useful for issuing a juvenile insurance policy for a potential payor and an insured via a computer, wherein the waiver of premium feature is triggered based at least in part upon a payor's ability to pay a premium;

electronically determining, via the computer, one of a juvenile insurance policy premium or a juvenile insurance policy death benefit, the juvenile insurance policy premium or death benefit computed based on the potential payor's affiliation as a member within an organization wherein:

organization members have at least one commonality between them, the premium or death benefit is independent of the potential payor's age, health, and gender, and a probability associated with a waiver of premium triggering event based on at least one of: (1) an eligibility requirement of the payor belonging to the organization; and (2) the incidence of the triggering event occurring to a subset of the organization; and offering, to the potential payor, the juvenile insurance policy having the waiver of premium feature and the determined premium or death benefit.

2. The method of claim 1, wherein an eligibility requirement for the potential payor to be in the organization comprises at least one of a maximum age and a generational qualification for payors.

3. The method of claim 1, wherein the waiver of premium feature is a standard feature of the juvenile insurance policy.

4. The method of claim 1, wherein the event that triggers the waiver of premium feature comprises death of the payor.

5. The method of claim 4, wherein the probability associated with an incidence of an event that triggers the waiver of premium feature for an individual of the group of acceptable payors or the subset of the group of acceptable payors is determined based on mortality data for the group of acceptable payors or the subset of the group of acceptable payors, respectively.

6. The method of claim 1, wherein the probability of an incidence of the event that triggers the waiver of premium feature accounts for at least one limitation for exercising the waiver of premium feature selected from a group consisting of a 2-year waiting period, a generational qualification, and an age limit for the insured.

7. The method of claim 1, wherein the premium and death benefit are determined based at least in part on the probability of an incidence of an event that triggers the waiver of premium feature accounting for the blend of the individuals of the group of acceptable payors with regard to at least one of age, gender, and generational qualification.

8. The method of claim 1, wherein the premium and death benefit are computed based at least in part on an anti-selection factor.

9. The method of claim 1, wherein the potential payor is at least one of: a parent, a guardian, a grandparent and a relative.

10. The method of claim 1, wherein the juvenile insurance policy insures the life of a minor.

* * * * *